United States Patent [19]

Wilson

[11] Patent Number: 4,813,641
[45] Date of Patent: Mar. 21, 1989

[54] DEVICE AND METHOD FOR ATTACHING AN OBJECT TO A SURFACE

[76] Inventor: Stanley K. Wilson, 7021 E. 64th Pl., Tulsa, Okla. 74133

[21] Appl. No.: 53,388

[22] Filed: May 22, 1987

[51] Int. Cl.⁴ .............................................. F26B 3/04
[52] U.S. Cl. ........................... 248/206.2; 248/309.1; 34/133; 34/104
[58] Field of Search ............... 248/610, 467, 103, 104, 248/205.5, 206.2, 206.3, 206.4, 309.1, 317, 362, 363; 24/17 B, 482; 34/133, 104, 236, 239

[56] References Cited

U.S. PATENT DOCUMENTS

| | | | |
|---|---|---|---|
| 1,483,640 | 2/1924 | Manning | 248/206.3 |
| 1,530,784 | 3/1925 | Midgley | 248/206.3 |
| 1,922,900 | 8/1933 | Plante | 248/205.5 |
| 2,231,230 | 2/1941 | Sturtz | 248/205.5 |
| 2,302,300 | 11/1942 | Davies | 248/206.5 |
| 2,457,918 | 1/1949 | Pierce | 248/205.5 |
| 2,502,714 | 4/1950 | Garnett | 248/206 |
| 2,815,919 | 12/1957 | Pribil | 248/363 |
| 2,980,379 | 4/1961 | Goldfus | 248/206 |
| 3,316,659 | 5/1967 | Lauck | 34/133 |
| 3,344,532 | 10/1967 | Bigler | 34/133 |
| 3,976,274 | 8/1976 | Langguth | 248/363 |
| 4,091,548 | 5/1978 | Daily | 34/133 |
| 4,109,397 | 8/1978 | Daily | 34/239 |
| 4,416,438 | 11/1983 | King | 248/104 |
| 4,702,016 | 10/1987 | Grigsby | 211/35 |

FOREIGN PATENT DOCUMENTS

| | | | |
|---|---|---|---|
| 888625 | 7/1949 | Fed. Rep. of Germany | 248/317 |
| 921619 | 5/1947 | France | 24/482 |
| 1479570 | 5/1967 | France | 248/205.5 |
| 313219 | 3/1956 | Switzerland | 248/205.5 |

*Primary Examiner*—J. F. Foss
*Assistant Examiner*—Robert A. Olson
*Attorney, Agent, or Firm*—Laney, Dougherty, Hessin & Beavers

[57] ABSTRACT

A device and method for attaching an object to a surface includes at least one elongate resilient member and an attachment assembly for attaching the elongate resilient member to a surface. Each elongate resilient member has two ends, the ends of each resilient member being connectable to form a loop. The attachment assembly is preferably a suction cup. The elongate resilient member is connected to the suction cup in the form of a loop, and the resilient loop is used to receive and retain an object. The object may then be attached to a surface. The device may be used for attaching the object to the inside wall of a rotatable chamber in such a manner that the object will rotate with the rotatable chamber without tumbling within the chamber.

1 Claim, 1 Drawing Sheet

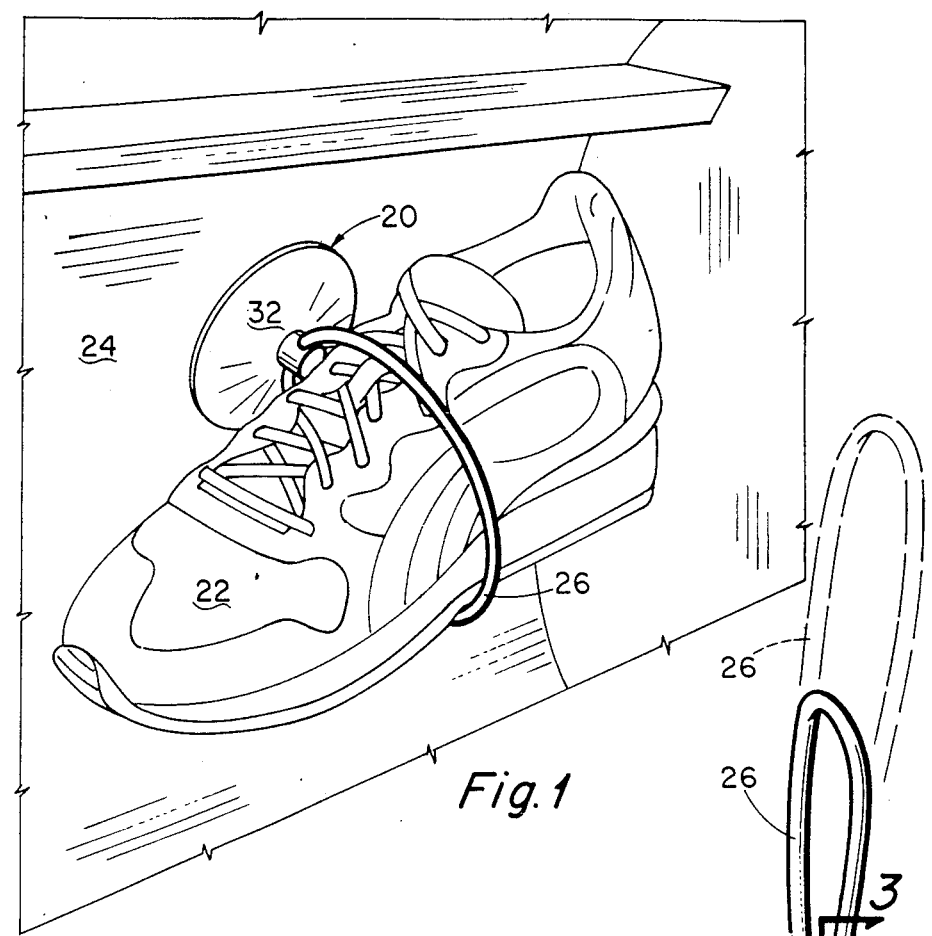
Fig. 1
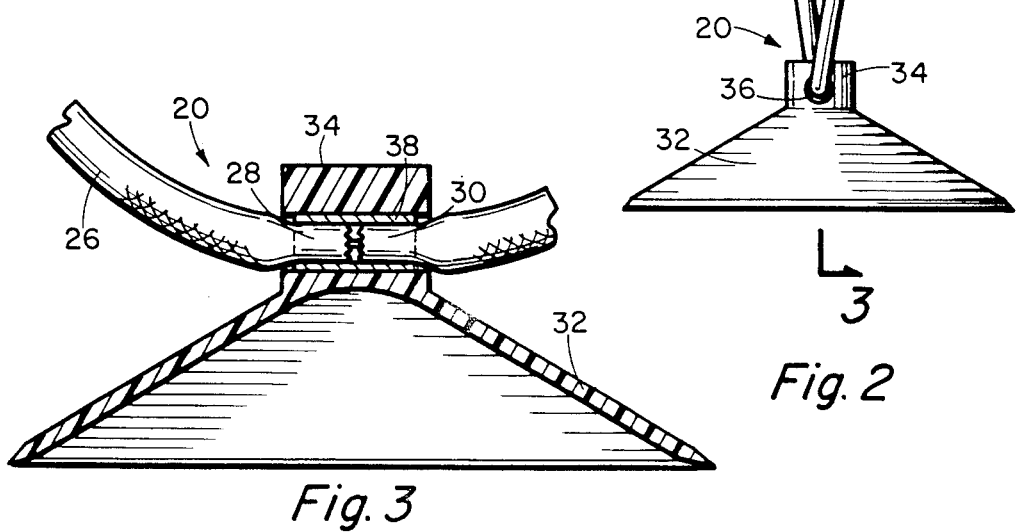
Fig. 2
Fig. 3

DEVICE AND METHOD FOR ATTACHING AN OBJECT TO A SURFACE

BACKGROUND OF THE INVENTION

This invention relates to a device and method for attaching an object to a surface and more particularly to such a device and method which may be used for attaching an object to the inside wall of a rotatable chamber in such a manner that the object will rotate with the rotatable chamber without tumbling within the chamber.

Devices for attaching objects to surfaces have been known for some time. For example, U.S. Pat. No. 2,502,714, issued to Garnett, discloses a fishing pole carrier which comprises a base, screw-threaded studs which project downwardly from the base into the nipple-like portion of two conventional vacuum or suction cups, a pair of arcuate arms which are formed integrally with and extend upwardly from the middle portion of the base to form a keeper seat between the arcuate arms, and an obliquely disposed slot which extends through the middle portion of the base with a flexible retaining strap passing through the slot to encircle and restrain a fishing pole. U.S. Pat. No. 2,980,379, issued to Goldfus, discloses the use of three suction cups to mount a rack for supporting a radio to a flat surface. U.S. Pat. No. 3,976,274, issued to Langguth, discloses an improved suction cup configured to ensure a permanent attachment on a surface.

The known devices have shortcomings in that they do not disclose a device or method for attaching an object to the inside wall of a rotatable chamber in such a manner that the object will rotate with the rotatable chamber without tumbling within the chamber. Nor do they disclose a method or device utilizing a resilient member or a resilient loop for attaching an object to a surface or to the inside of a rotatable chamber.

SUMMARY OF THE INVENTION

It is therefore an object and advantage of the invention to provide a device for attaching an object to a surface utilizing an elongate resilient member or a resilient loop.

It is a further object and advantage of the present invention to provide a device and method for attaching an object to the inside wall of a rotatable chamber in such a manner that the object will rotate with the rotatable chamber without tumbling within the chamber.

It is a further object and advantage of the present invention to provide a method and device for attaching an article of clothing, such as a shoe, to an inside wall of the rotatable drying chamber of a clothes dryer in such a manner that the object will rotate with the rotatable drying chamber without tumbling within the chamber.

It is a further object and advantage of the present invention to provide a method and device for attaching an object, such as a shoe, to the inside wall of the rotatable drying chamber of a clothes dryer in such a manner that the object will rotate with the rotatable chamber without tumbling within the chamber and which is not affected by heat, which will remain attached to the drying chamber throughout the drying cycle, which eliminates the noise caused by the object tumbling within the dryer, which will allow a shoe or similar object to dry during a normal clothes dryer drying cycle, which will adapt to resiliently restrain practically all sizes of shoes and other objects, and which is inexpensive and expendable.

The device and method of the present invention includes at least one elongate resilient member and connection means for connecting the elongate resilient member to a surface. Each elongate resilient member has two ends. The ends of each resilient member are connectable to form a loop. In one embodiment the elongate resilient member is an endless loop of resilient material. In the preferred embodiment the attachment means is a suction cup, the elongate resilient member being attached to the suction cup. The resilient member may be sized to receive and retain objects of various sizes.

BRIEF DESCRIPTION OF THE DRAWINGS

The present invention will be better understood by reference of the examples of the following drawing:

FIG. 1 is a perspective view of a preferred embodiment of the device and method for attaching an object to a surface, illustrating a tennis shoe attached to the inside wall of the drying chamber of a clothes dryer;

FIG. 2 is a front view of a preferred embodiment of the device for attaching an object to a surface; and FIG. 3 is a sectional view along line 3—3 of FIG. 2.

DETAILED DESCRIPTION OF THE PREFERRED EMBODIMENTS

Before explaining the present invention in detail, it is to be understood that the invention is not limited to the details of construction and arrangement of parts illustrated in the accompanying drawings, since the invention is capable of other embodiments and of being practiced and carried out in various ways commensurate with the claims herein. Also, it is to be understood that the terminology employed herein is for the purpose of description and not of limitation.

FIGS. 1-3 present preferred embodiments of a device, generally designated 20, for attaching an object 22 to a surface 24 and are also used to exemplify a method of attaching an object 22 to a surface 24. The illustrated, preferred embodiment is used to connect an object 22 such as a shoe, also designated 22, to an inside wall, also designated 24, of the drying chamber of a clothes dryer in such a manner that the object 22 will rotate with the rotatable chamber without tumbling in the chamber. It is intended to be understood from this description that the invention may be applied to any rotatable chamber as well as to stationary surfaces.

The general inventive concept may be described as a device and method for securing an object 22 to a surface 24 or within a rotatable chamber which will allow the object 22 to rotate with the chamber while preventing the object 22 from tumbling within the chamber by fastening or securing the object 22 to an inside wall 24 of the rotatable chamber. The object 22 should be fastened to wall 24 securely enough to prevent tumbling and to hold the object 22 throughout the rotational cycle. If there are to be other objects (not illustrated) tumbling within the rotatable chamber while the object 22 is fastened to the inside wall 24, as is common in a clothes dryer, the fastening of the object 22 to the inside of the chamber must be sufficiently secure to withstand collisions with the objects tumbling in the chamber. The fastening may be effected by mechanical devices such as spring clips, cinches, etc. Preferably, the fastening is effected by connecting at least one flexible elongate member 26 to the inside of the rotatable chamber and securing the object to the elongate member 26. More preferably, the elongate member 26 is a flexible resilient elongate member, also designated 26. Most preferably, the elongate member is a resilient loop, also designated 26, connected to the inside of the rotatable chamber and the object 22 is secured within the loop 26 by the resilience of the loop 26, as best seen in FIG. 1.

In the preferred embodiment the elongate resilient member 24 has two ends 28, 30 and the ends 28, 30 of the resilient member 26 may be connected to form the loop, as illustrated in FIG. 3. More than one elongate resilient member 26 may be used if desired, although the inventor has found one resilient member 26 to be sufficient in the tested applications. The resilient member 26 may be a bungee cord or stretch cord as are commonly commercially available. In the illustrated, preferred embodiment the resilient member 26 is a "Mini Tie Down Stretch Cord" commercially available from Bungee International Manufacturing Corporation of Chatsworth, Calif.. The cord has a stretch range of 75% beyond unstretched length and is 5/32 inches in diameter and 10 inches long. As mentioned above, the illustrated, preferred embodiment is used to attach shoes to the inside of a clothes dryer chamber, and the above-mentioned size of cord is appropriate for most shoes. It is intended to be obvious from the description that any length or number of cords or elongate members 26 may be used as necessary to hold objects of various sizes.

Referring to the example of FIG. 1, in the preferred embodiment, attachment means 32 are used to attach the device 20 to the surface 24, or to the inside wall 24 of the rotatable chamber. The attachment means 32 may be a form of relatively permanent attachment such as welding, riveting, bolting, screws, adhesives, integral molding, etc. Preferably, particularly when the device 20 is to be used for clothes dryers, the attachment means 32 should be detachable from the surface or rotatable chamber, as is possible by using snaps, clips, pin connections, mechanically operated suction devices, etc. Most preferably the attachment means 32 is a suction cup, also designated 32 as best exemplified in FIGS. 2 and 3. The suction cup should be of high quality, unaffected by heat or cold, and capable of retaining its adhesion to the surface or wall 24 throughout the rotational cycle of the chamber, and retaining its adhesion to the rotational chamber wall 24 while encountering collisions from objects tumbling within the chamber. Suction cups of this quality are readily available commercially. The suction cup 32 of the illustrated, preferred embodiment, is known as "Adams Cup" available from Adams Manufacturing of Portersville, Pa. The illustrated embodiment is a 2½ inch cup which will hold up to 8 pounds. The cup is advertised as not being affected by heat or cold and as adhering to glass, porcelain, steel, as well as windows and storm doors.

The elongate resilient member 26 may be connected to the attachment means 32 with an adhesive, chemical bonding, integral molding, a mechanical fastener, or similar means. In the preferred embodiment, referring to FIGS. 2-3, the suction cup 32 has a base 34. The base is perforated, and the perforation 36 is used to attach the elongate resilient member 26 to the suction cup. The ends 28, 30 of the elongate resilient member 26 are crimped together with a metal crimp 38. The metal crimp 38 is then pulled inside the perforation 34. Since most metals conduct and retain heat, the crimp 38 will become hot to the touch in a clothes dryer and the crimp 38 is pulled inside perforation 36 to protect a user from contacting the hot crimp 38. The crimp 38 may be made of a material having a low thermal conductivity or the resilient elongate member 26 may be attached to the suction cup 32 with an adhesive, chemical bonding, integral molding, or similar means, which does not conduct heat. When the device 20 is to be used to secure a shoe 22 to the inside wall 24 of a clothes dryer chamber the attachment means 32 and elongate resilient member 26 should be sized to hold the shoe 22 sufficiently close and securely to the wall 24 that the shoe 22 does not bang against the wall 24 and make noise, since one of the purposes of the device 20 is to eliminate the noise made by shoes or similar objects in a dryer or rotating chamber.

While the invention has been described with a certain degree of particularity, it is manifest that many changes may be made in the details of construction and the arrangement of components without departing from the spirit and scope of this disclosure. It is to be understood that the invention is not limited to the embodiments set forth herein for purposes of exemplification, but is to be limited only by the scope of the attached claim or claims including the full range of equivalency to which each element thereof is entitled.

What is claimed is:

1. A shoe retaining device, comprising:
    a shoe;
    at least one elongate resilient member, each elongate member having two ends, the ends of the elongate member being connected to form a loop resiliently retaining the shoe; and
    a suction cup attached to the at least one elongate resilient member, for attaching the shoe to the inside wall of a rotatable chamber in such a manner that the shoe will rotate with the rotatable chamber without tumbling within the chamber.

* * * * *